United States Patent [19]
Crawley et al.

[11] 3,918,209
[45] Nov. 11, 1975

[54] METAL REMOVAL APPARATUS

[75] Inventors: Stanley Crawley, Formby; Walter Taylor, Billinge, both of England

[73] Assignee: BOC Limited, London, England

[22] Filed: Aug. 19, 1974

[21] Appl. No.: 498,608

[52] U.S. Cl.................... 51/5 D; 51/34 G; 51/47; 51/99
[51] Int. Cl.².................................. B24B 19/02
[58] Field of Search ..... 51/5 D, 34 G, 47, 99, 92 R, 51/254, 255; 228/13, 15; 29/483, 482

[56] References Cited
UNITED STATES PATENTS

| | | | |
|---|---|---|---|
| 2,418,738 | 4/1947 | Talboys | 51/34 G |
| 3,517,460 | 6/1970 | Stewart | 51/5 D |
| 3,562,959 | 2/1971 | Dooley | 51/99 X |
| 3,708,920 | 1/1973 | Kaszuba | 51/47 X |

FOREIGN PATENTS OR APPLICATIONS

| 1,125,803 | 3/1962 | Germany | 51/47 |
|---|---|---|---|

*Primary Examiner*—Al Lawrence Smith
*Assistant Examiner*—Nicholas P. Godici
*Attorney, Agent, or Firm*—Dennison, Dennison, Meserole & Pollack

[57] ABSTRACT

A machine for removing metal from the back of butt-welded seams, to form a groove in which further weld metal can be deposited, uses a motor-driven shaped grinding wheel adapted to be biased about a pivotal axis into contact with the workpiece.

11 Claims, 8 Drawing Figures

METAL REMOVAL APPARATUS

In joining steel plates by a welding process, it is usual to bevel or chamfer those edges of the plates which are to be welded together, the bevelling being such that small perpendicular edge faces are left. Before the welding process, the bevelled edges are brought together so that the edge faces abut, forming at least one V-shaped groove into which weld metal is deposited, becoming fused to the bevelled edges.

The abutting flat edge faces at the root of the weld deposit are a source of potential weakness because of the lack of fusion between them. To eliminate this weakness it is known to gouge out metal from the non-welded (or back) side of the workpiece until sound weld metal is reached. Thereafter fresh weld metal is deposited in the groove formed by the gouging process, becoming fused both to the first weld metal and to the freshly-exposed surfaces of the parent metal.

The gouging away of the undesired abutting surfaces is usually done by an arc-gouging or flame-gouging process. This process leaves an imperfect finish which normally has to be hand-dressed to remove the imperfections. The combination of gouging and hand-dressing is slow and expensive.

The present invention therefore aims at providing metal removal apparatus adapted to produce a groove of chosen cross-section in a workpiece, and accordingly provides metal removal apparatus which is as claimed in the appended claims.

The present invention will now be described by way of example with reference to the accompanying drawings, in which.

Figure 1:
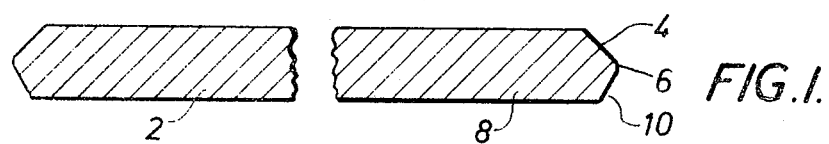
FIGS. 1 to 6 show the sequential formation of a longitudinal weld which is particularly suitable for being background by the metal removal apparatus of the present invention.

The apparatus of the present invention is particularly useful for ensuring the integrity of the welds used in manufacturing hollow, tubular sections from steel plate. The tubular sections are intended to be joined together to make legs for oil production platforms. The steel plate used normally ranges in thickness from about ⅝ inches to 2¾ inches (16 mm to 70 mm). The first step in producing a tubular section is to prepare the edge faces which are to be welded together for the later welding process. The parallel edge faces of the metal plate 2 are given the illustrated shape by use of a triple-torch cutting machine (not shown) or otherwise. The first torch is normally used to cut a first chamfered face 4; the second torch is used to produce an edge face 6 which is perpendicular to the major faces 8 of plate 2, and the third torch is used to produce a second chamfered edge face 10. It will be appreciated that the chamfered faces 4 and 10 can ke at the same or at different angles to the adjacent major face 8 of the plate 2. As shown, the angles are different.

Figure 2:
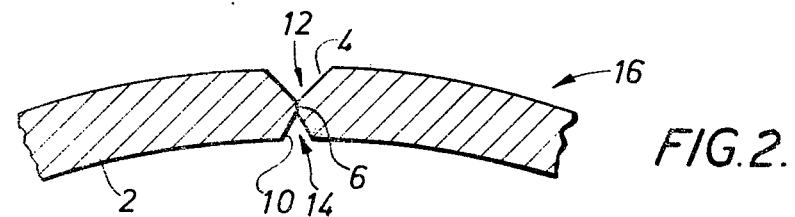
Figure 3:
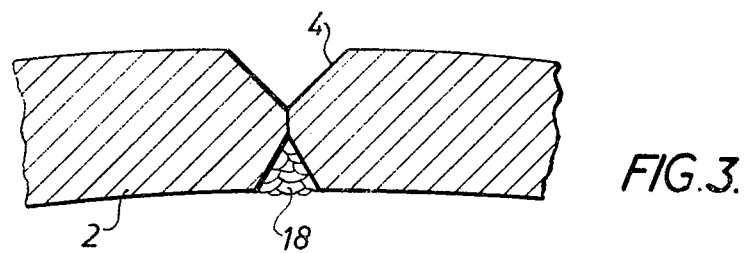

During a later metal-bending operation, the plate 2 is bent into a complete circle with the perpendicular edge faces 6 abutting each other. It will be seen from FIGS. 2 and 3 that the chamfered edge faces 4 and 10 cooperate to form V-sectioned grooves 12 and 14 in the outer and inner curved surfaces of the resultant tubular section 16.

After the metal-bending operation, successive runs of weld metal are deposited by any suitable welding apparatus in the inner groove 14. This would normally be done with the groove in the lowermost position, and with the welding apparatus positioned above the groove inside the section 16. Although formed by as many runs as are necessary, it will be convenient in the following description to refer to a single weld deposit 18.

Figure 4:
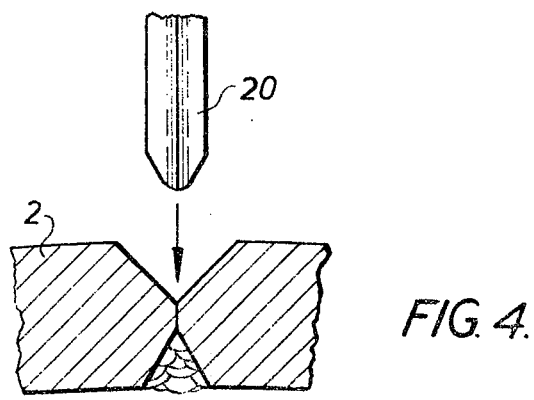
Figure 5:
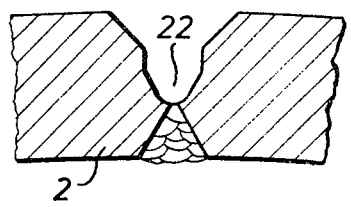
Figure 6:
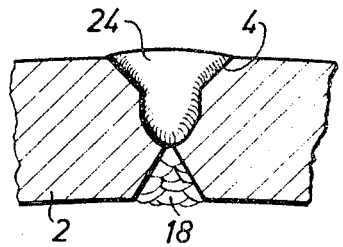

As a prelude to the back-grinding operation, the section 16 is rotated through about 180° i.e. until the groove 12 is positioned at the top of section 16. Thereafter the metal removal apparatus of the present invention is used to grind away the abutting faces 6 and the adjacent portions of the parent metal and of the weld deposit 18. This is done by using a grinding wheel 20 having the profile shown in FIG. 4. The wheel 20 is urged downwardly in the direction indicated by the vertical arrow in FIG. 4, and at the same time is moved in parallel with the abutting faces 6 and weld deposit 18. The actual depth to which the workpiece is ground is determined by the rate at which metal can be removed by the grinding wheel. It is highly unlikely that sufficient metal could be removed in a single pass, so as many passes of the grinding wheel are made as are necessary to achieve a groove 22 in the workpiece such as is shown in FIG. 5. It will be appreciated that, in reaching this cross-section, the grinding wheel has removed sufficient of the parent metal and of the weld deposit to produce a wide groove into which further weld metal can be deposited to effect a sound fusion weld.

After the back-grinding operation, further weld metal is deposited by a suitable process in as many runs as are necessary to produce a second deposit 24. Because of the previous preparation of groove 22 and the contiguous chamfered edge faces 4, this second deposit is firmly fushion-bonded to the respective faces of parent metal and of the first deposit 18.

Figure 7:
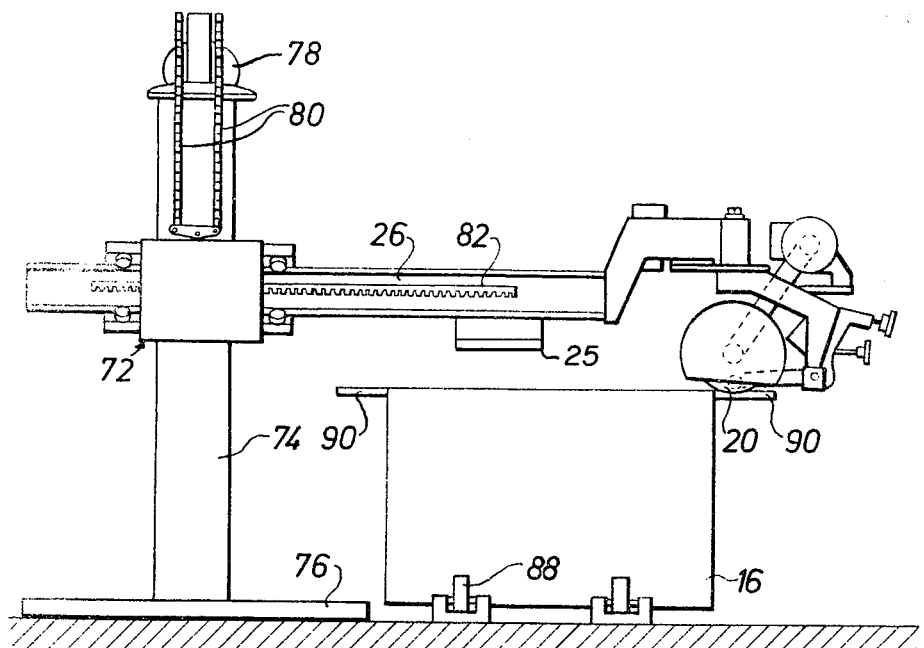
FIG. 7 is a side elevation of a boom-mounted metal removal apparatus of the present invention.
Figure 8:
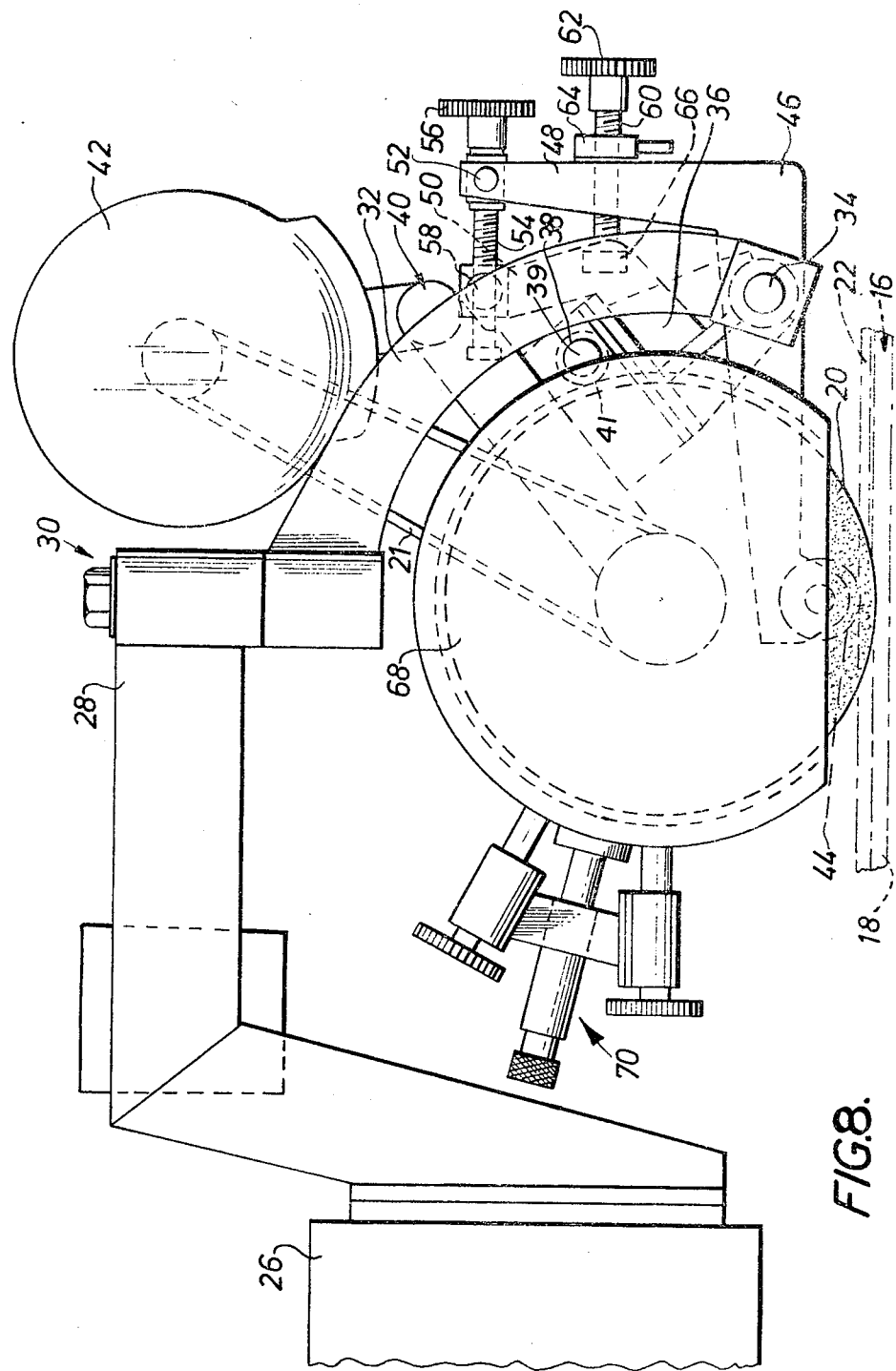
FIG. 8 is a side elevation of one form of metal removal apparatus of the present invention.

One example of metal removal apparatus of the present invention is shown in FIGS. 7 and 8 of the accompanying drawings.

FIG. 7 shows one form of metal removal apparatus of the present invention secured to one end of a horizontally-movable boom 26 which is supported by a carriage 72 movable vertically along the axis of a column 74 extending from a platform 76. The column carries at its upper end an electric motor 78 driving a pair of chain wheels meshing with two parallel chains 80. One end of each chain is coupled to the carriage 72, and the other end of each chain, after passing over its chain wheel, goes into the interior of column 74, where both are coupled to a counterweight. This arrangement permits the height of the boom from the ground to be adjusted accurately over a wide range.

Secured to a side face of boom 26 is a rack 82 engaged by a pinion driven by an electric motor forming part of carriage 72. The motor is under the control of an operator preferably positioned closely to, and movable with, the metal removal apparatus, such as by lying on a platform 25 secured to the respective end of boom 26 and to one side of the grinding wheel 20 so that the grit and like debris from the grinding operation passes clear of the operator.

The construction of the grinding apparatus itself is shown in more detail in FIG. 8.

The tubular pipe-section 16 on which the apparatus is to operate is supported on conventional motor-driven rollers 88. These enable the section 16 to be positioned with its abutting edges in the bottom dead centre position while the edges are welded together from inside the section, and then to be rotated by 180° to bring the weld to the top dead centre position for the back of the weld to be ground.

Aligned with the weld are run-on and run-off plates 90. These are welded to the end faces of the section 16, and have their outer surfaces flush with the outer surface of the section. This enables the grinding wheel to be set to the appropriate depth before it comes in contact with the section 16 and to maintain this depth throughout the whole length of the weld, by means of the plate-riding roller 44 contacting the run-on and run-off plates 90 at the start and end of each pass of the grinding machine.

Extending from boom 26 is a support arm 28 connected through a coupling 30 having a vertical axis to an arcuate arm 32 carrying a support shaft 34 at its lower end. The coupling 30 is of the type which permits the arm 32 and the equipment carried by it to pivot about the vertical axis. By means which are not shown in the drawing, the arm 32 can be locked in either of two limit positions which are orthogonally related to each other. In the usual position, as shown the axis of support shaft 32 is perpendicular to the direction of travel of boom 26, and is therefore the position used when the apparatus is to remove metal from the back of longitudinal welds. However, in the other limit position, the support shaft 34 extends in parallel with what would be the normal direction of movement of the boom 26, although in fact the boom would not be driven with the shaft and grinding wheel 20 etc. in this position. This position enables the apparatus of the present invention to be used wor removing the metal from the back of peripheral welds in tubular workpieces. For such an application the boom would be kept stationary at a position such that the grinding wheel 20 is aligned with the V-shaped groove 12 backing the first weld deposit 18. Thereafter, the tubular workpiece is rotated by the rollers 88, the rate of rotation being such that the grinding wheel traverses the outer surface of the workpiece at substantially the same rate as when used for back-grinding longitudinal welds.

Pivotally mounted on the support shaft 34 is an arm 36 carrying a slide bearing 38 and shaft 39 encircled by a pair of helical compression springs 41, only one of which is shown. The bearing 38 is such that it permits movement of the movable part of the bearing in a direction parallel to the axis of shaft 34. The movable part of bearing 38 is connected to a sub-assembly (generally referenced 40) which has at one end means for mounting the grinding wheel 20 and which carries at its other end an electric motor 42. The motor is connected to drive the grinding wheel 20 by two or more V-belts 21. From the drawing it will be readily appreciated that the line of action of the centre of gravity of the sub-assembly 40 passes to the left (as viewed) of shaft 34, so that the arm 36 is biased by gravity to pivot in an anti-clockwise direction as viewed. Unless otherwise restrained, the weight of the sub-assembly 40 tends to force the grinding wheel 20 into contact with the tubular workpiece 16.

The extent to which the grinding wheel can gouge its way into the workpiece is determined by a roller 44 which positioned adjacent to the lowest point of grinding wheel 20 and is intended to ride on the outer surface of workpiece 16. The roller 44 is carried on one end of a lever on 46 having the shaft 34 as its fulcrum. Remote from the roller 44, arm 46 is provided with an offset extension 48 for purposes which will be described below.

Extending from arm 36 is a second offset extension 50.

Positioned in the outer end of extension 48 is a collar 52 which is able to move angularly to a extent relatively to extension 48. Rotatably mounted in collar 52 is an unthreaded portion of a rod 54 having at one end a hand wheel 56. The other end of rod 54 is screw-threaded, and this portion is engaged by a nut 58 (illustrated only diagrammatically) seated in the outer end of extension 50. It will be appreciated that, as the hand wheel 56 is rotated, the effective distance between the collar 52 and nut 58 is altered. This results in the spacing between the bottom dead centres of grinding wheel 20 and roller 44 also altering. As the absolute position of the roller 44 is determined by its contact with the workpiece 16, the effect of rotating the hand wheel 56 is to alter the depth to which the grinding wheel 20 gouges out a groove in workpiece 16.

Screwed into extension 48 is a screw 60 provided with a hand wheel 62. The screw can be locked in any desired position by means of a lock nut 64. The other end of screw 60 projects beyond the extension 48 into contact with a stop 66 projecting from the respective face of arm 32. The function of the adjustable stop provided by screw 60 is to limit the extent to which the sub-assembly 40 can pivot under gravity about shaft 34. This is to allow for when the metal removal apparatus is lifted from the section 16, so that the roller 44 becomes no longer effective to control the position of the sub-assembly 40.

In accordance with good industrial practice, the grinding wheel 20 is provided with a shield 68 which is designed to expose only the lowermost portion of the grinding wheel 20. As illustrated, the shield 60 carries a device shown generally at 70 by which a partially-worn grinding wheel may be dressed to restore the desired profile. The industrial diamond dressing tools, forming part of device 70, are able to come into contact with the grinding wheel 20 when so desired, through appropriately-shaped apertures (not shown) in shield 68.

Although this is not shown in FIG. 8, the slide bearing 38 is designed so that the movable part thereof, and with it the sub-assembly 40, is able to move through a distance of about 1 inch (25 mm). The movable part of the slide is biased to a position central of this range by two counteracting compression springs each bearing against a fixed seat at one end, and against the bearing at the other end. The rating of these springs is such that the whole of the sub-assembly 40 is able to be moved from its central position by contact of the grinding wheel 20 with the surfaces of groove 22. This freedom of the grinding wheel to 'float' is essential to enable the grinding wheel to follow the line of the weld deposit despite any slight misalignment there might be between the longitudinal weld and the axis of the boom, and also to allow for any non-linearity there might be in the groove 22.

Means are also provided, but are not shown, for allowing the position of the arm 36 on the shaft 34 to be adjusted manually within limits. This enables the apparatus to be set up initially so that the mid-point of the range of 'floating' movement of the slide bearing 38 is aligned with the bottom of the V-groove 22 which is to be ground. Once this position has been reached, the manual adjustment of arm 36 on shaft 34 is fixed, thereafter leaving any departures from linearity or from being parallel to be accommodated by the slide bearing itself.

When the metal removal apparatus of the present invention is to be used, it is normally reciprocated along the length of the weld so as to remove metal in successive passes in opposite directions. However, it is within the discretion of the operator as to whether or not he chooses to remove metal while travelling always in the same direction relatively to the workpiece, the working passes being separated by idling passes in the opposite direction.

During the working passes, the grinding wheel can be rotated either clockwise or anti-clockwise (as viewed from the same side). Normally that one of these directions is preferred which directs the removal metal along the length of the boom 26 but away from the column 74. This is to ensure that the resultant grit and like debris from the grinding operation does not foul or otherwise damage the machined surfaces on the column on which run the rollers of the carriage 72 supporting the boom. The direction of rotation of the grinding wheel relative to the direction of movement of the carriage 26 is also important. This is because if these relevant directions are such that the grinding wheel tends to 'climb grind' the workpiece, by which is meant that the wheel tends to climb the sloping face being abraded by the grinding wheel, this can lead to excessive stresses being placed on the grinding wheel. Under particularly adverse conditions, the stresses imposed on the grinding wheel, as a result of its trying to climb out of the groove being ground, can result in fracture of the grinding wheel. It is therefore preferred for the direction f rotation of the grinding wheel to be such that the debris is ejected in front of the path of the boom, so that there is no tendency to climb grind.

It will be appreciated that this choice of direction of rotation of the grinding wheel might militate against the preferred direction of the working pass. It is therefore within the purview of the present invention for means being provided for reversing the direction of rotation of the grinding wheel so that it is rotating in the optimum direction relative to the direction of the working pass, particularly when the working passes are in successive, opposite directions. With this two-way working, with alternation of the direction of rotation of the grinding wheel, the apparatus would normally be provided with at least one shield against which the debris impacts so as to prevent its falling on the column 74. Normally two such shields would be provided so as to prevent the debris from also being projected into the workshop and becoming a nuisance or hazard to other work-people. The alternating directions of rotation of the grinding wheel can be effected by any suitable means, such as by interposing a reversing gear in the drive to the driving belts, or by changing over two of the phases when a three-phase supply is used to drive motor 42.

Irrespective of the direction of rotation of the grinding wheel 20, matters are arranged so that it is rotated at an angular speed which gives rise to a speed at the surface of the grinding wheel of about 9,500 ft. per minute (about 48 m/s). This speed is normally the maximum unloaded speed at which resinoid-bonded grinding wheels are recommended to be rotated. It will be appreciated that this speed is normally reduced under load by contact of the grinding wheel with the workpiece.

It will thus be seen that the present invention provides apparatus which is particularly useful for 9emoving metal from the back of longitudinal welds, although the apparatus could be used for removing metal from the back of peripheral welds.

What we claim is:

1. Metal removal apparatus, including a resinoid-bonded grinding wheel mounted on a sub-assembly also supporting a motor arranged to drive the grinding wheel at a high speed, in which the sub-assembly is mounted on a slide supported by an arm pivotally mounted on a support shaft; a riding roller mounted on one end of a lever also pivoted on the support shaft and able to be pivoted by controlled amounts relatively to the arm supporting the sub-assembly, the roller axis being parallel to the grinding wheel axis and adjustably spaced therefrom.

2. Metal removal apparatus as claimed in claim 1, in which the slide is biased to a position intermediate the limits of movement of the slide.

3. Metal removal apparatus as claimed in claim 2, in which the slide is biased by two compression springs acting on the slide in opposition to each other.

4. Metal removal apparatus as claimed in claim 1, in which the position of the arm along the support shaft is also adjustable.

5. Metal removal apparatus as claimed in claim 1 in which the lever carrying the riding roller has an offset extension extending adjacent to a similar extension from the said arm, and in which the outer ends of both extensions are connected by a member of adjustable effective length which therefore controls the angular positions of both extensions, and therefore of the axes of the riding roller and grinding wheel, relative to the support shaft.

6. Metal removal apparatus as claimed in claim 5, in which the member of adjustable effective length is a rod of which part is screw-threaded and is engaged by a nut mounted in one extension, and of which part is plain and is engaged by a collar mounted in the other extension, whereby rotation of the rod is effective to alter the spacing between the nut and the collar.

7. Metal removal apparatus as claimed in claim 5, in which one of the said extensions carries an adjustable stop adapted to come into contact with a member which is fixed relatively to the support shaft so as to define one limit position for joint movement of the riding roller and grinding wheel about the support shaft.

8. Metal removal apparatus as claimed in claim 1, in which the line of action of the centre of gravity of the sub-assembly is spaced horizontally from the support shaft when the apparatus is in its working position, so that riding roller and grinding wheel are biased by gravity into contact with a workpiece positioned below the apparatus.

9. Metal removal apparatus as claimed in claim 1, in which the support shaft and the members carried thereby are connected to a horizontally-movable boom by means of a coupling adapted to permit movement of the support shaft about a vertical axis between two limit positions which are disposed orthogonally relatively to each other, the coupling being able to be locked in each of the limit positions.

10. Metal removal apparatus as claimed in claim 9, in which the boom supports a seat for the operator which is displaced to one side of the plane of the grinding wheel when it is in one of its orthogonal positions.

11. Metal removal apparatus as claimed in claim 1 in which the support for the grinding wheel also carries means for dressing the wheel to give it a desired profile.

* * * * *